United States Patent [19]

Boughner et al.

[11] Patent Number: 5,182,946
[45] Date of Patent: Feb. 2, 1993

[54] PORTABLE WELL ANALYZER

[75] Inventors: Murphy D. Boughner, Nowata; Paul J. Padilla, Tulsa; Floyd A. Bowling, Broken Arrow, all of Okla.

[73] Assignee: Amerada Hess Corporation, Tulsa, Okla.

[21] Appl. No.: 789,288

[22] Filed: Nov. 8, 1991

[51] Int. Cl.$^5$ .................. E21B 47/00; G06F 15/00
[52] U.S. Cl. ..................... 73/151; 73/862.543; 364/422
[58] Field of Search ............ 73/151, 767, 773, 862.54, 73/516 R; 166/66, 250; 364/422

[56] References Cited

U.S. PATENT DOCUMENTS

| | | | |
|---|---|---|---|
| 3,343,409 | 9/1967 | Gibbs | 73/151 |
| 3,355,938 | 7/1965 | Neely et al. | 73/141 |
| 3,457,781 | 7/1969 | Elliot | 73/151 |
| 3,765,234 | 10/1973 | Sievert | 73/151 X |
| 3,824,851 | 7/1974 | Hagar et al. | 73/151 |
| 4,043,191 | 8/1977 | Mills | 73/151 |
| 4,064,763 | 12/1977 | Srinivasan | 73/516 R |
| 4,090,405 | 5/1978 | McKee | 166/154 |
| 4,803,886 | 2/1989 | May et al. | 73/773 |
| 4,817,049 | 3/1989 | Bates et al. | 73/151 X |
| 4,932,253 | 6/1990 | McCoy | 73/151 |

Primary Examiner—Tom Noland
Assistant Examiner—Michael Brock
Attorney, Agent, or Firm—Head & Johnson

[57] ABSTRACT

A device for use on a well pumping unit. The device provides for real time measurement and recording of acceleration of a polished rod resulting from the oscillating linear motion induced by the rotating motion of the pumping unit crank. The device includes accelerometers with adequate sensitivity to allow response to both slow and fast changes in acceleration using earth's gravity as the reference point. Further, the device includes a load measuring apparatus for measuring the loads resulting at the polished rod from the weight of the subsurface coupled rod string and pumped fluids. The load measuring apparatus includes a cylindrical steel spool on which four two-element rosette strain gauges are cemented. Circuit intelligence identifies the load cell for proper calibration reference and records the real time load and acceleration data and transfers the data to a non-volatile data storage card for analysis on an external computer without the necessity of long transfer cables.

26 Claims, 5 Drawing Sheets

PORTABLE WELL ANALYZER

BACKGROUND OF THE INVENTION

1. Technical Field of the Invention

The present invention relates in general to oil field testing and production equipment and in particular to the process of measuring polished rod loads and polished rod acceleration associated with a well pumping unit and recording the measured data onto a nonvolatile storage medium. The measurements are made and recorded by an apparatus attached to the polished rod thus eliminating the use of cables that would otherwise extend from a stationary apparatus to the polished rod.

2. Description of the Related Art

A number of solutions have been proposed in the prior art for measurement of stroke length of well pumping units.

One device for making measurements of the vertical positions of polished rods is made by Delta-X Corporation of Houston, Tex. This equipment is referred to as an AT-01 Angle Transducer TM. It is mounted to the Sampson Post of a pumping unit. A potentiometer shaft from an angle transducer is connected by means of mechanical linkages to a clamp mounted on the pumping unit beam. The device thus measures the angle between the Sampson Post and the pumping unit beam. By knowing specific pumping unit dimensions and applying simple geometrical formulae, the stroke length and stroke position of the pumping unit can then be inferred. However, the device requires precise alignment between the structural members of the pumping unit. With continuous operation and vibrations resulting from the oscillating pumping unit, misalignment and wear of the potentiometer mechanism eventually occurs to cause the position determination to become inaccurate.

Another use of a similar device for measurement of vertical position on a beam pumping unit is manufactured by NABLA Corporation of Midland, Tex. This position indicating device is somewhat similar to that of Delta-X except that the potentiometer is mounted above the carrier bar and is activated by a taut line that is attached to a fixed reference point, generally the wellhead. This mechanical windlass device requires accurate alignment for determination of the vertical position of the polished rod as it strokes up and down during a pumping cycle. Wind induced forces acting on the extended taut line can cause it to become bowed, resulting in inaccurate measurements of stroke length. Neither of these known methods directly measure the vertical or lateral acceleration of the moving polished rod.

The loads on a polished rod can be measured by use of a load cell that uses strain gauges. One such use of a strain gauge load cell for making polished rod load measurements is reference in U.S. Pat. No. 4,090,405 to McKee. This disclosure shows a segmented device that is clamped to the polished rod and has surfaces above and below the position of a cemented strain gauge for transferring load to the device. The transferred load stresses the stain gauge. U.S. Pat. No. 3,355,938 to Neely et al references a load cell that includes a jack screw mechanism for transferring load to the cell that includes strain gauge. A still further device is a load cell manufactured by Interface, Inc. of Scottsdale, Ariz. This is referred to as a LoadTrol TM load cell. This device is installed on the polished rod above the hanger carrier bar and below the polished rod clamp. When the load cell is subjected to compressional loads, the resistance through the strain gauge network, although very small, is measured and the strain so calculated is indicative of the loads at the polished rod. All of these devices require an electrical cable to transfer measured data from the strain gauges and polished rod position indicator to a storage medium for analysis. The cable and the end connectors introduce additional resistance to that which comes by virtue of the strain imposed on the load cell along, thus causing inaccuracies in the actual loads being applied at the polished rod. In addition, improper identification of the load cell may result in incorrect calibration reference.

Therefore, there is a need for a device that can provide accurate real time measurement and recording of the vertical and lateral motion of the polished rod and polished rod load information without the necessity of a long electrical cable used by the prior art for transfer of the measurements to a storage medium.

It is an object of this invention to provide a device for real time measurement of vertical and lateral acceleration, velocity, linear position and stroking frequency of a polished rod during pumping operations.

It is a further object of this invention to provide a device for use on a well pumping unit located at the earth's surface that can measure, in real time, loads and positional information on the pumping unit polished rod so that such loads and position information can be synchronized to allow determination of loads and position at the subsurface fluid pump located at the bottom of the well.

It is a further object of this invention to provide a device for use on a well pumping unit to provide polished rod load and positional information that does not have moving parts and is therefore not susceptible to mechanical wear.

It is a further object of this invention to provide an electronic recording device for use on a well pumping unit, the recording device having built-in intelligence to identify the load cell being read for proper calibration reference and to record real time polished rod data onto a non-volatile data card without the necessity of a long electrical cable generally associated with data transfer to external storage devices.

It is still a further object of this invention to provide an intelligent polished rod mounted device that when integrated with a communication radio can provide telemetered real time measured events at the surface, such as acceleration and polished rod load. Such information can be telemetered to a central location for analysis of the pumping system.

SUMMARY OF THE INVENTION

The present invention is a device for use on a well pumping unit. The device provides for real time measurement and recording of acceleration of a polished rod resulting from the oscillating linear motion induced by the rotating motion of the pumping unit crank. The device includes accelerometers with adequate sensitivity to allow response to both slow and fast changes in acceleration using earth's gravity as the reference point. Further, the device includes a load measuring apparatus for measuring the loads resulting at the polished rod from the weight of the subsurface coupled rod string and pumped fluids. The load measuring apparatus includes a cylindrical steel spool on which four two-element rosette strain gauges are cemented, and an amplifier and load cell identifier circuit board.

The device of this disclosure includes a housing with built-in intelligence and batteries to provide power to strain gauge and accelerometers. Circuit intelligence identifies the load cell for proper calibration reference and records the real time load and acceleration data and transfers the data to a non-volatile data storage card for analysis on an external computer without the necessity of long transfer cables, as is employed in the prior art devices.

The apparatus of this invention provides accurate position information at precise time durations so that events occurring at any subsurface location along the coupled rod string extending in the well from the pumping unit, including the fluid pump, can be determined.

Prior art devices for obtaining positional information of well pumping unit polished rods require mechanical attachments at two physical locations. Generally, one end of a lever or taut string is attached to a rigid location on the wellhead or pumping unit member and the other end is attached to a member that oscillates up and down during a pumping unit stroke. Unlike the aforementioned, the device of this invention requires attachment to the well pumping unit at only one location. The device of this disclosure is attached to the pumping unit oscillating polished rod and the earth's gravity provides a fixed reference for motion up and down. Derived electrical signals in the device are directly proportional to the acceleration of the device with respect to the earth since the device is attached to the pumping unit polished rod that usually moves perpendicular to the earth, therefore the device is always moving toward or away from the earth.

The use of accelerometers, load cells, amplification, identification circuit board, intelligent electronics and an electronic recording medium for providing information about a well pumping system affords several advantages heretofore unavailable.

Among the advantages of the present system for monitoring a well pumping unit are:

1. Mechanical linkages subject to wear and fatigue are eliminated.
2. Acceleration is directly affected by mechanical friction in the pumping system, while displacement or position is not. Thus, frictional components are included in the electrical signal from the accelerometer. The frictional component can be used to evaluate the mechanical wear characteristics of the surface pumping unit and subsurface pumping equipment.
3. Elimination of a mechanically fixed reference point makes a possible a device that attaches to the polished rod and provides all pertinent data without dangerous lines, steel wires or linkages.
4. Regulation of the input voltage and amplification of the output signal from the full bridge network of strain gauges at the gauge location used in the device mitigates the error which otherwise results from the internal resistance of long leadwires and cables.
5. Proper identification of the load cell so that correct calibration data relating load to measured strain can be referenced.
6. Long electrical cables required for the transfer of the measured data to an external storage device are eliminated.

A better understanding of the invention will be had by reference to the following description and claims, taken in conjunction with the attached drawings.

DESCRIPTION OF THE PREFERRED EMBODIMENTS

Figure 1:
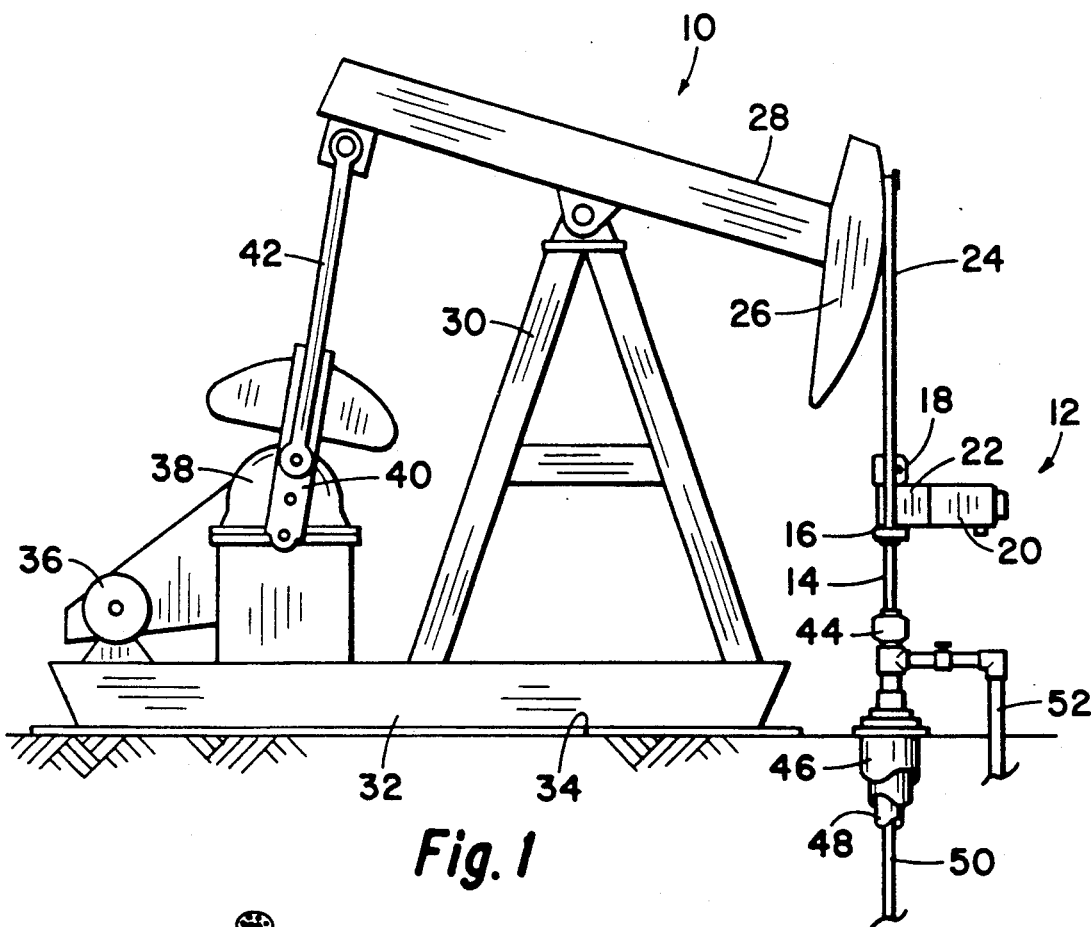
FIG. 1 is an elevational view of a conventional pumping unit at its most downward position with the apparatus of this invention installed on the polished rod.

FIG. 1 shows an elevational view of a conventional pumping unit, generally indicated by the numeral 10, at its most downward position with the apparatus of this invention for providing information as to the well pumping conditions generally indicated by the numeral 12. The apparatus is mounted on the pumping unit polished rod 14 between a carrier bar 16 and a clamp 18. A portable housing 20 having electronic intelligence circuits therein is removably attached to a first housing 22 during the data acquisition period which may involve many pumping cycles.

First housing 22 includes a cylindrical steel spool and strain gauges as will be described subsequently. The first housing is supported between carrier bar 16 and clamp 18. The carrier bar 16 is suspended from a cable hanger or bridle 24 which, in turn, is attached to a horsehead 26 affixed to the outer end of the beam 28 of pumping unit 10. The beam is pivotally supported atop a surface 30 that rests on base 32. The base, in turn, rests upon the earth's surface 34. A prime mover 36 supplies power to a gear box 38 that rotates a crank arm 40. One end of beam 28 is attached to crank arm 40 by a pitman arm 42. Thus, when prime mover 36 is energized beam 28 is oscillated to move horsehead 26 up and down to thereby provide oscillatory up and down movement of polished rod 14. The polished rod extends through a stuffing box 44 and through a wellhead 46 and into a tubing string 48 that extends to the bottom of the well. Polished rod 14 is connected at its lower end to a string of sucker rods 50 that extend to a subsurface location in the well, where, at the lower end of the string of sucker rods a bottom hole pump (not shown) is attached. The reciprocation of polished rod 14 and sucker rod string 50 serve to reciprocate the bottom hole pump to move fluid upwardly from the producing formation through the interior of tubing 48 to the earth's surface. The produced fluid is carried away from the wellhead through a lead line 52 to a storage tank or treatment facilities.

While the basic concepts of reciprocating a string of sucker rods and the bottom hole pump attached to it are simple in principle, they are complex in practice. Conditions constantly change in the bottom of a well as the pump wears, the tubing leaks, the pump valves leak, the well fluid levels drop or rise and so forth. For these reasons, it is important for the operator of pumping unit 10 to have up-to-date and accurate information as to the pumping action taking place. For this purpose, first housing 22 is affixed to polished rod 14 between carrier bar 16 and polished rod clamp 18 so that the full weight of the polished rod, the sucker rod string 50, the bottom hole pump and the weight of the fluid columns supported by the bottom hole pump extending within tubing 48 to the earth's surface is received.

Figure 2:
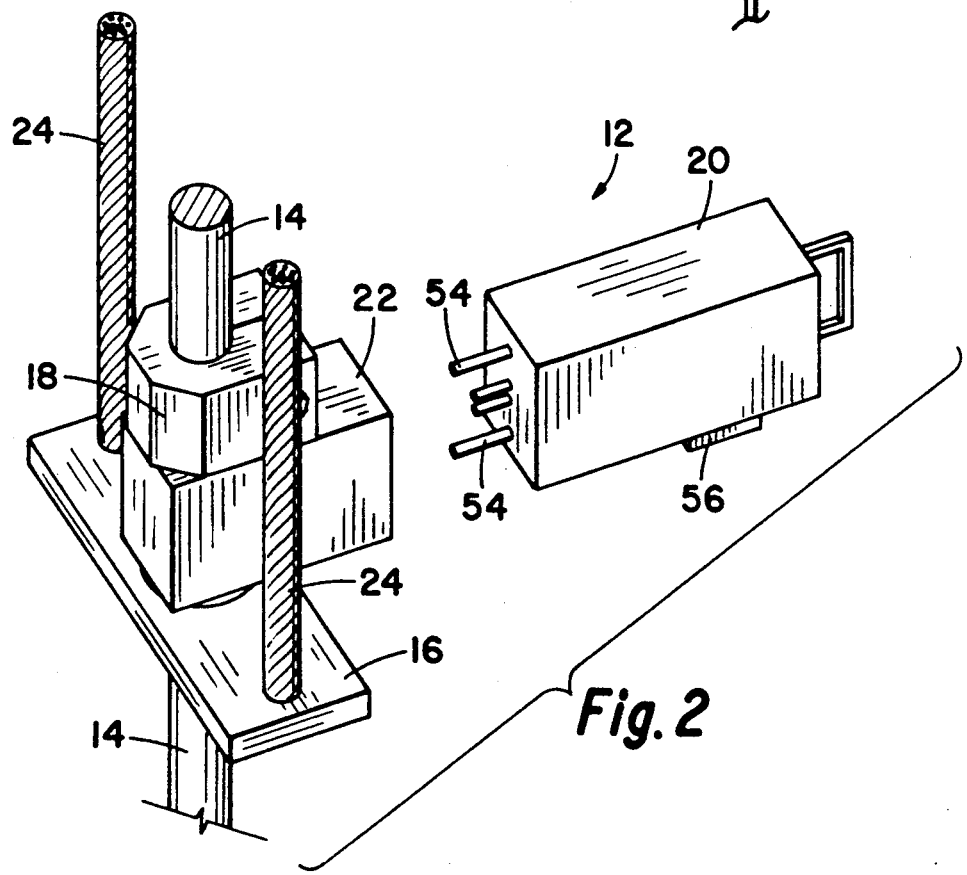
FIG. 2 is an enlarged isometric view of a pumping unit carrier bar, polished rod, and polished rod clamp in conjunction with the apparatus of this invention as seen in FIG. 1.

In FIG. 1 all of the apparatuses illustrated are standard technology as commonly employed in the petroleum industry except elements 20 and 22 which contain the basic concepts of this invention. Reference will now be had to FIG. 2 which shows more details of these components and how they fit into the typical well pumping system.

Referring to FIG. 2 there is shown an isometric view of first housing 22 permanently installed on polished rod 14 between pumping unit carrier bar 16 and polished rod clamp 18. Wire rope 24, commonly called a bridle, supports carrier bar 16. When measurements are being made portable housing 20 having electronic intelligence therein is connected to first housing 22 and is held in place by guide pins 54. A nonvolatile data card 56 is inserted into portable housing 20 to begin the acquisition of polished rod load and polished rod acceleration data. At the conclusion of the data acquisition period an audible signal from portable housing 20 verifies that all data has been acquired and that data card 56 may be removed and processed on an external computer to assess the operation of the pumping unit system.

Figure 3:
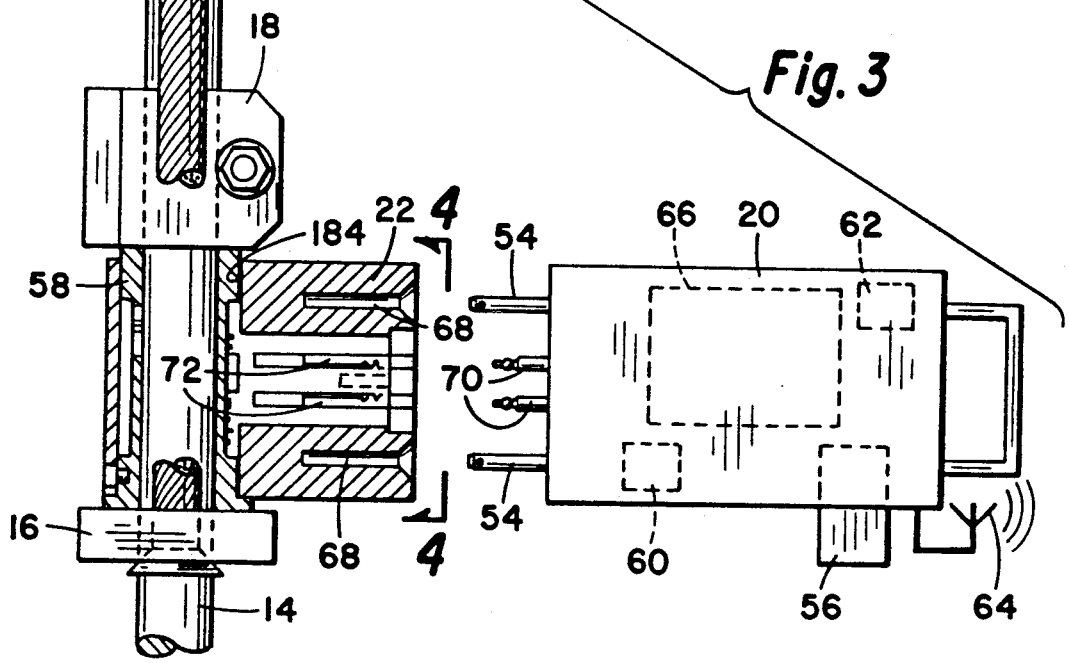
FIG. 3 is a sectional view of an embodiment of the present invention illustrating the position of the load cell, pumping unit carrier bar, polished rod, polished rod clamp, and intelligent device when making load cell and accelerometer data measurements, and recording the measurements in a non-volatile data storage card.

As shown in FIG. 3 a load cell spool 58 is enclosed in first housing 22 and is mounted on polished rod 14 between polished rod clamp 18 and carrier bar 16. When taking measurements of the polished rod loads and acceleration, portable housing 20 is affixed to first housing 22.

Portable housing 20 includes accelerometer devices 60, a power source 62, data card 56, and other associated electronics 66. Portable housing 20 is attached to first housing 22 and held in place by tension roller bearing guide pins 54 received in pin guides 68 on first housing 22. Contact pins 70 on portable housing 20 make electrical contact with the first housing electronics through the spring loaded jacks 72 in first housing 22.

Figure 5:
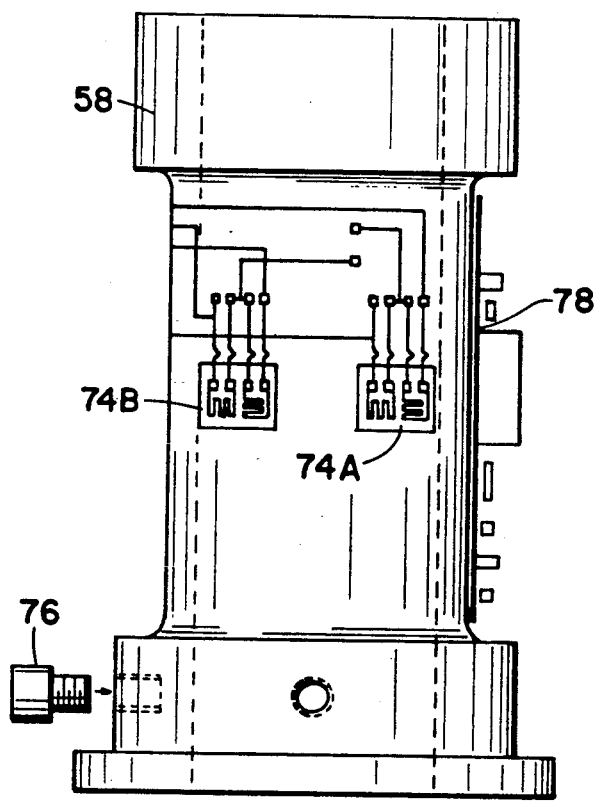
FIG. 5 is an illustration of a load cell spool with four two-element rosette strain gauges and an amplifier circuit attached to it.

Referring to FIG. 5, a load cell spool 58 is comprised of a tubular steel spool on which high-resistance foil strain gauge rosettes 74 (only 2 of which are seen in FIG. 5) are mounted. A strain gauge rosette, therefore, consists of multiple strain gauges arranged at convenient angles to each other, as shown by example rosette pairs 74A and 74B with two-element 90 degree "tee" strain gauges per rosette. Each rosette pair is affixed 90 degrees apart at a central position around the circumference of load cell 58. Load cell spool 58 is held in place within first housing 22 by means of cap screws 76 for easy replacement. Mounted within first housing 22 and affixed to load cell spool 58 are signal amplification, load cell identification and power voltage regulation electronics 78. Introduction of electronics in extreme proximity to strain gauges 74 substantially mitigates interference from external electro-magnetic sources and contact resistance.

Figure 6:
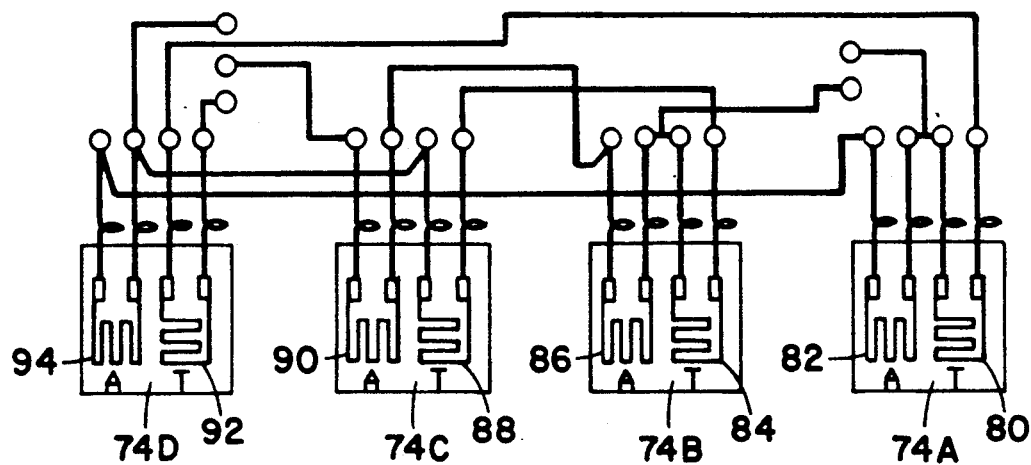
FIG. 6 is a circuit diagram showing the interconnection of four two-element rosette strain gauges that are attached to the load cell spool of FIG. 5.

Referring to FIG. 6, rosette strain gauge pair 74A has gauges 80 and 82; rosette pair 74B has gauges 84 and 86 and are spaced 90 degrees from pair 74A, rosette pair 74C has gauges 88 and 90 and are spaced 90 degrees from pair number 74B or 180 degrees from rosette pair number 74A; and rosette pair 74D has 92 and 94 and are spaced 90 degrees from rosette pair 74C or 180 degrees from rosette pair 74B. Gauges 82, 86, 90 and 94 from each rosette pair are termed the active gauges and measures the absolute strain along the axis where the strain is maximum, and rosette gauges 80, 78, 88 and 92 are termed the transverse gauges and measures the strain perpendicular to the principle axis of maximum strain. Therefore, the active rosette gauges 82, 86, 90 and 94 are in compression (negative strain) and the transverse rosette gauges 80, 74, 88 and 92 are in tension (positive strain) at their mounted location during operation. Each rosette pair of strain gauges have two pair of pig-tailed wires that are soldered to form a full Wheatstone bridge 96 as seen in FIG. 7.

Figure 7:
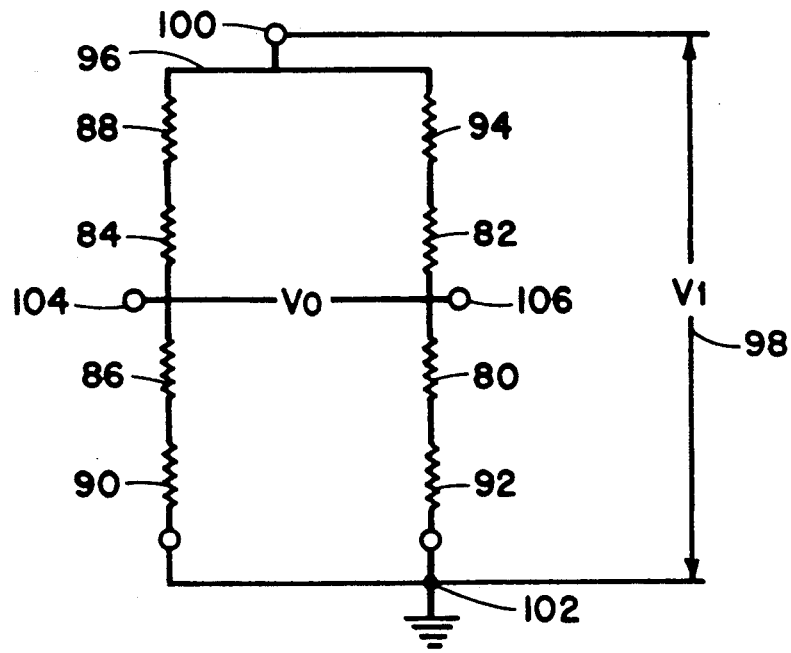
FIG. 7 is a simplified circuit diagram showing the strain gauges of the four two-element rosette strain gauges connected in a bridge circuit.

FIG. 7 shows an electrical schematic for the full bridge 96. The strain gauge sensors described herein use a fully active Wheatstone bridge to achieve the highest sensitivity possible from all active and transverse strain gauges. The bridge resistance is a function of the applied strain. Bridge resistance elements 82, 86, 90 and 94 represent the active strain gauges and resistance elements 80, 74, 88, and 92 represent the transverse strain gauges of each rosette pair, respectively. Input from a voltage source 98 is applied between bridge terminal 100 and ground terminal 102. An output voltage is measured between terminals 104 and 106. As tubular spool 58 is subjected to varying loads, such as compressional or tensional, the bridge elements experience resistance changes and produce an output voltage signal between terminals 104 and 106. These voltage signatures are calibrated by dead weight test loads for absolute measurement of the applied load on spool 58.

Figure 9:
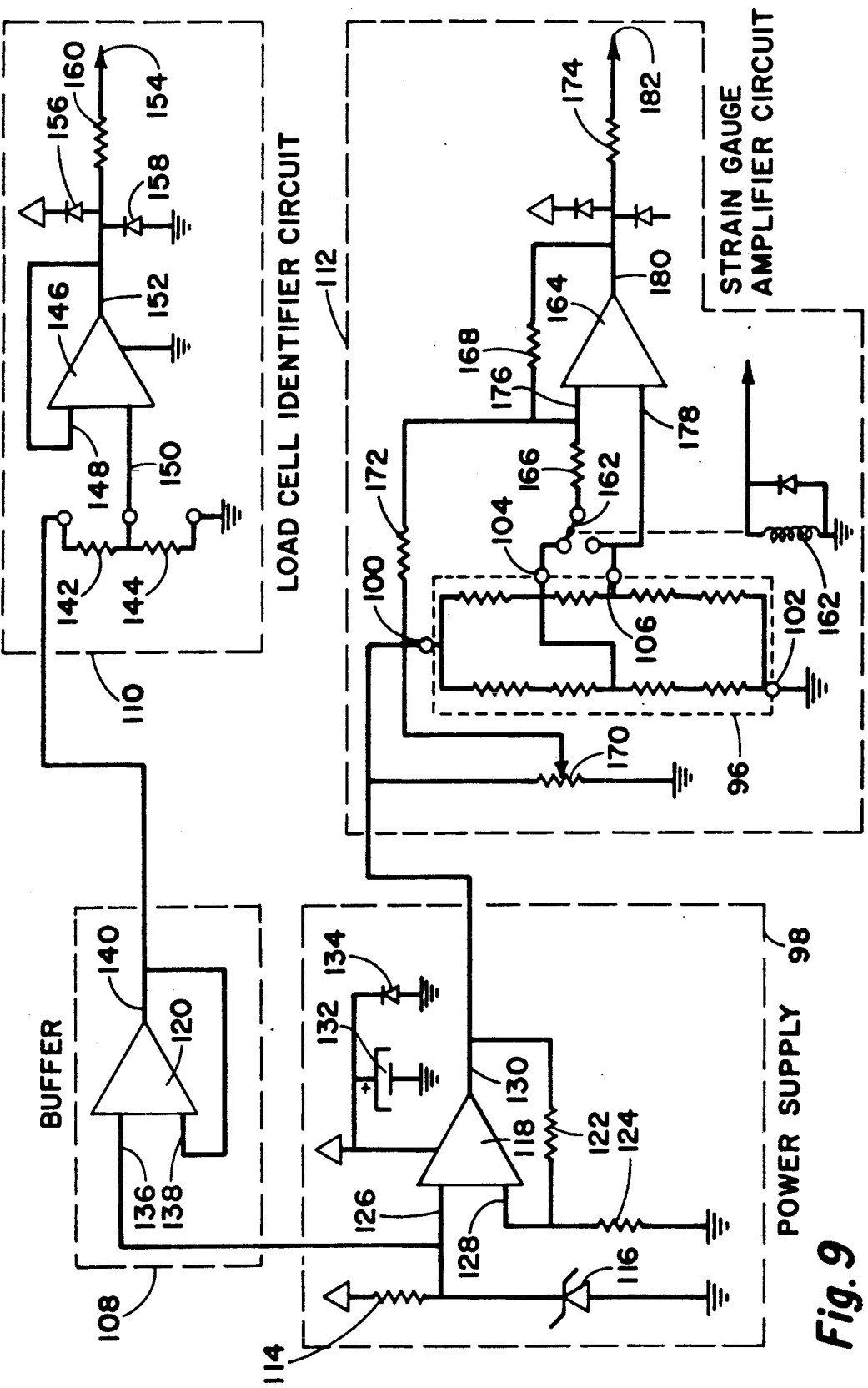
FIG. 9 is a single-line electrical schematic of the amplifier stage used to transform a high-impedance voltage signal presented by the strain gauges to a low-impedance output signal and a resistance circuit network used to identify the load cell.

Referring to FIG. 9, there is shown a single-line diagram of the amplifier and load cell identifier circuit. These have been segmented for clarity and discussion as a bridge power supply 98, a five volt buffer 108, a load cell identifier circuit 110 and a strain gauge amplifier circuit 112. The bridge power supply 98 is comprised of resistor 114 and reference diode 116 forming a temperature compensated constant input voltage source to amplifiers 118 and 120 of five volt buffer 108. The value of resistor 114 is chosen so as to limit the current through the reference diode 116 to approximately 1.0 milliampere when nominal voltage is applied across resistor 114 and reference diode 116. Reference diode 116 is designed to a constant voltage at the junction of resistor 114 and reference diode 116 of 5.00 volts over a wide temperature range. Amplifier 118 is configured as a non-inverting amplifier with a gain of two-to-one by setting resistors 122 and 124 equal. A regulated voltage of 5.00 volts is applied to the non-inverting input 126 while the inverting input 128 is fed from the junction of resistors 122 and 124 that have a very low temperature drift of no more than fifty parts per million per degree centigrade and a tolerance of less than one percent. The amplifier output 130, with the two-to-one gain, will be ten volts. Capacitor 132 serves to filter the supply voltage and to bypass high frequency noise to ground. Zener diode 134 is included as both a reverse voltage and over voltage protection for all associated amplifiers. Within the five volt buffer 108, amplifier 120 is configured as a non-inverting, unity gain buffer with two inputs 136 and 138, and one output 140. The non-inverting input 136 is fed from reference diode 116 of the bridge power supply 98 while the inverting input 138 is tied directly to amplifier output 140 resulting in an output from amplifier 120 approximately equal to the voltage at the non-inverting input 136, thus assuring a stable drive voltage to series resistors 142 and 144 of the load cell identification circuit 110.

Referring now to the load cell identification circuit 110, resistors 142 and 144 are one percent tolerance with a temperature drift of less than fifty parts per million per degree centigrade. Resistor values for 142 and 144 are selected to produce a unique voltage to amplifier 146 within the range of 0.005 volts to 4.990 volts, in steps of 0.005 volts. Thus, each load cell up to 998 in number can be identified for proper calibration data. As shown, amplifier 146 is configured as a non-inverting, unity gain voltage buffer with two inputs 148 and 150 and one output 152 available to an externally attached data acquisition device 154 through a suitable connector. Diodes 156 and 158 protect the amplifier output at 152 against induced voltages. Resistor 160 is chosen to limit the current to a safe operating limit dictated by amplifier 146.

Strain gauge amplifier circuit 112 employs the full bridge 96 as shown in FIG. 7. A differential voltage from strain gauge bridge 96 is fed through relay 162 to amplifier 164. The gain from amplifier 164 is fixed by selection of resistors 166 and 168. Variable resistor 170 and resistor 172 adds or subtracts current from the summing nodes of resistors 166 and 168 to compensate for offset current within amplifier 164. Resistors 172, 166, 168 and 174 are one percent tolerance with a temperature drift of less than fifty parts per million per degree centigrade. Resistor 174 is chosen to limit current to a safe operating limit dictated by amplifier 164. As shown, amplifier 164 is configured as a differential amplifier with two inputs 176 and 178 and one output 180 available to an externally attached data acquisition device 182 through a suitable connector. Energizing relay 162 results in the non-inverting input 178 of amplifier 164 to be shorted to the inverting input 176 of amplifier 164 resulting in an output at amplifier 164 that is irrespective of the load on the load cell spool. This output is representative of "zero" loading on the load cell spool that when compared to the load cell calibration data verifies the integrity of the strain gauge amplifier circuit 112 and bridge power supply circuit 98.

Figure 4:
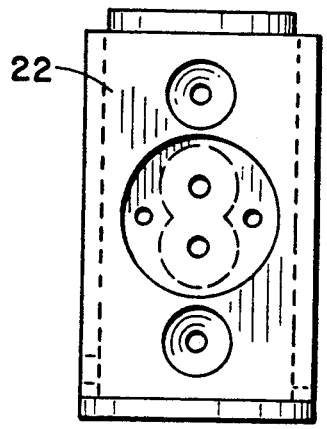
FIG. 4 is an elevational view taken along the line 4—4 of FIG. 3 showing one end of the housing affixed to the pumping unit polished rod.

Referring now to FIG. 4 there is shown a front view of first housing 22. As shown in FIG. 3, spool 58 is positioned in the spool receiving area 184 and held in place by three cap screws 76 (see FIG. 5). Provided in first housing 22 are two pin alignment guide holes 68 for receiving the electronic intelligence instrument contained in portable housing 20 as previously described.

Figure 8:
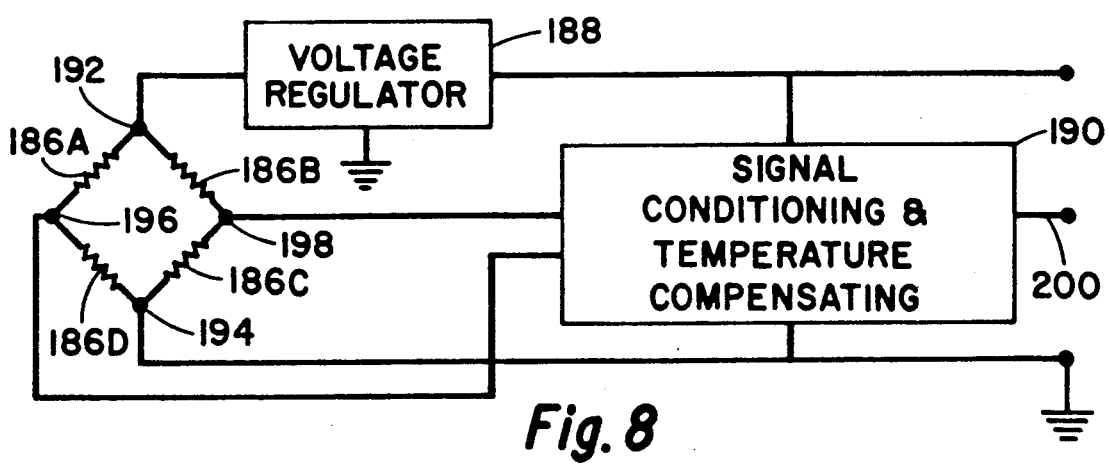
FIG. 8 is an electrical schematic of the solid state accelerometer component employed in the apparatus of this invention.

Referring to FIG. 8, there is shown an electrical schematic for the accelerometers referenced by numeral 60 of FIG. 3. The accelerometer that contains a cantilever sensor chip with integral air damping (not shown) uses strain-sensing resistors 186A, 186B, 186C and 186D in a fully active bridge to achieve the highest resonant frequency and highest sensitivity simultaneously possible. The module contains an input voltage regulator 188 and a temperature compensation and signal conditioning circuit 190. The voltage for regulator 188 is input to the bridge between terminal 192 and 194. The output signal between terminals 196 and 198 is passed through the signal conditioner and temperature compensator circuit 190. The final output voltage signal is at terminal 200. A change in output voltage at terminal 200 is indicative of a change in acceleration. Two accelerometers of the type shown in FIG. 8 are provided, one for measuring the motion along the principal axis of motion and one for measuring motion in the lateral axis.

Figure 10:
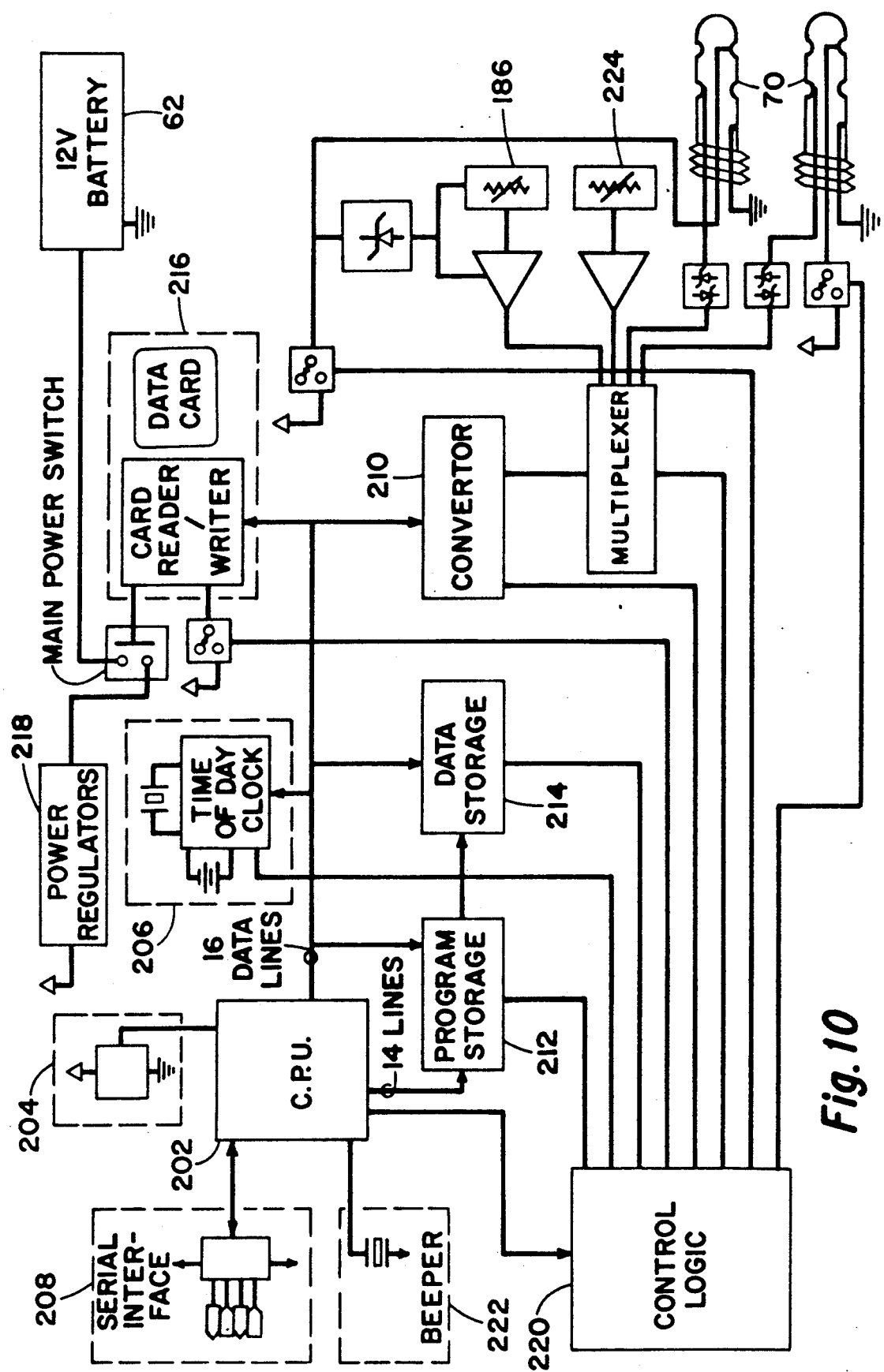
FIG. 10 is a schematic of the electronic intelligence employed in the device of this disclosure.

Referring now to FIG. 10 there is shown an electrical schematic of the electric intelligence contained with portable housing 20 as seen in FIG. 3. The central processor unit (CPU) referenced by numeral 202 is, by example, a NATIONAL SEMICONDUCTOR model HPC-46003-V30. CPU 202 is a 16-bit architecture for all internal registers, arithmetic logic unit (ALU), and all data and address busses. The CPU has 256 bytes of high speed random access memory (RAM), 52 input/output (I/O) connections, 8 counter/timers, and a universal receiver/transmitter (UART) that are fabricated using low power technology and designed to operate at a maximum of 30 mega Hertz (mHz). The CPU clock is maintained at 16 mHz thereby requiring only 40 milli-ampere drain on the power source 62. Additional to the CPU 202 there is provided a self contained crystal oscillator 204 that provides frequency stability to the CPU clock at 16 mHz. The real time clock (RTC) 206 is, by example, a NATIONAL SEMICONDUCTOR, model DP-8570, implemented to maintain day, date, time of day, calibration parameters and to provide a baud clock for the UART. The alarm logic within model DP-8570 is fully utilized by programming interrupts to the CPU so as to further conserve power while in an idle status. The serial communications interface 208 is, by example, a Harris model ICL-232CPE integrated circuit interface used to condition the data and provide the communications protocol to conform to RS-232 standards. In addition to providing data conditioning and RS-232 protocol, the circuit supplies a negative 8-volt bias to the converter 210 that may be in the form of an analog interface. The converter 210 is connected to the CPU 202 and allows the selection of up to eight analog signals through an eight channel multiplexer. Each analog signal is converted to a 12-bit digital representation within the range of 0.0 volts to 5.0 volts. Temperature compensation, input protection and power conversation are implemented within the analog interface circuitry. All CPU program instructions are stored in a nonvolatile read only memory (ROM) 212. Program variables and data awaiting transfer are temporarily stored in a 32, 768-byte static random access memory (RAM) 214 directly connected to the CPU address and data busses. The transfer of data from RAM storage 214 is accomplished through the input/output (I/O) device 216. The I/O device 216 is comprised, by example, of a KOATSU GAS KOGYO card reader/writer, model RDU-88E, and a model R-32 non-volatile data card. A low power telemetry radio, by example REPCO radio, model RDFSK-6U (not shown in FIG. 10) may be substituted for I/O device 216, thereby accomplishing the telemetering of all signals to a distant location for analysis of the well pumping system. There are no electrical connections between the card reader/writer and the data card. Data is communicated to and from the data card through a sequence of magnetic pulses. Data cards are interchangeable and reusable, allowing one instrument to be used at multiple locations or for multiple applications with the results of each task recorded on the same or different data cards. The I/O device 216 is powered down when not in use to converse power from power supply 62. The operating power source 62 is a 12-volt lead acid type battery capable of providing 1.0 ampere per hour of energy and can be charged through an external connection.

Insertion of the data card 56 in the reader/writer mechanism causes a normally open switch to close, completing the circuit from the 12-volt battery to the power regulators 218. The control logic 220 is contained in several integrated circuits and functions to enable or disable the various component parts of the instrument under control of the program instructions resident in ROM 212. The beeper circuit 222, under control of CPU 202, emits an audible signal output informing the operator that the data acquisition has begun. Another audible signal is emitted informing the operator that data acquisition is complete and that the non-volatile data card may be removed and processed on an external computer. Instead of collecting the data on a data card the information may be transmitted to a remote location, such as by an antenna 64, as seen in FIG. 3. At the remote location the data can be collected and analyzed.

FIG. 10 shows accelerometer 186 that has resistors 186A-186D as illustrated and described with reference to FIG. 8. The second accelerometer 224 is also shown.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. For use with a well pumping unit having a polished rod with a string of sucker rods extending downwardly therefrom to a downhole pump that is reciprocated by the vertical reciprocal action of the polished rod to lift pumped fluid to the earth's surface, a self contained integrated system for collecting data indicative of the well pumping conditions, comprising:

a load sensing member mounted on and reciprocated with the polished rod for detecting the instantaneous weight supported by the polished rod;

a first circuit supported by and reciprocated with the polished rod and connected to said load sensing member for providing a first signal indicative of the instantaneous weight supported by the polished rod;

an accelerometer supported by and reciprocated with the polished rod;

a second circuit supported by and reciprocated with the polished rod and connected to said accelerometer providing a second signal indicative of the instantaneous displacement of the polished rod;

a data writer supported by and reciprocated with the polished rod and being connected to receive said first and second signals;

a housing mounted on and reciprocated with the polished rod and containing said load sensing member, said accelerometer, said first circuit, said second circuit and said data writer, the housing being adapted to removably receive a recorder;

a recorder removably insertable in said housing irrespective of whether said polished rod is stationary or is being reciprocated as the well is pumped to connect with said data writer to thereby receive thereon said first and second signals whereby the recorder may, after being removed from said housing, be employed to determine the well pumping conditions; and a battery within said housing providing power for said load sensing member, said accelerometer, said first and second circuits and said data writer.

2. A system for collecting data indicative of a well pumping conditions according to claim 1 wherein said housing is in the form of a first housing portion and a second housing portion, said first housing portion being mounted on and reciprocated with the polished rod and containing said load sensing member and said first circuit, said second housing portion being readily removably attachable to said first housing portion to be thereby reciprocated with the polished rod, said second housing portion containing said accelerometer, said second circuit, said data writer and said battery and being adapted to removably receive said recorder.

3. A system for collecting data indicative of a well pumping conditions according to claim 2 wherein one of said first housing portion and said second housing portion has structural docking pins extending therefrom and wherein the other of said first housing portion and said second housing portion has structural pin guides therein configured to telescopically receive and secure said docking pins providing means whereby said second housing is structurally attachable to and detachable from said first housing irrespective of whether said first housing portion is stationary or is being reciprocated with the polished rod.

4. A system for collecting data indicative of a well pumping conditions according to claim 1 wherein said load sensing member is in the form of a spool member mounted on and supporting the weight of the sucker rod string, the downhole pump and the pumped fluid and including:

a strain gauge affixed to said spool member.

5. A system for collecting data indicative of a well pumping conditions according to claim 4 wherein said strain gauge is in the form of a plurality of rosette strain gauges each having a multiplicity of sensitive strain gauge portions, the rosettes being spaced equally apart in a common plane on said spool member and electrically connected by said first circuit whereby the outputs are integrated to provide said first signal in the form of a unified output load measurement signal.

6. A system for collecting data indicative of a well pumping conditions according to claim 5 including four rosette strain gauges each having a multiplicity of sensitive strain gauge portions connected in series and wherein said first circuit includes said rosettes being connected in a bridge with a D.C. voltage thereacross, the output of the bridge circuit providing said first signal that is responsive to the combined vertical and horizontal stress on said spool and thereby the load applied to said polished rod.

7. A system for collecting data indicative of a well pumping conditions according to claim 4 wherein said first circuit includes an amplifier secured directly to said spool member adjacent to said strain gauge.

8. A system for collecting data indicative of a well pumping conditions according to claim 1 wherein said accelerometer means is in the form of a plurality of accelerometers, the accelerometers being configured to provide signals in at least two axes.

9. A system for collecting data indicative of a well pumping conditions according to claim 1 including:
an apparatus secured to said housing for providing an operator's signal.

10. A system for collecting data indicative of a well pumping conditions according to claim 9 wherein said operator's signal is an audible signal.

11. A system for collecting data indicative of a well pumping conditions according to claim 1 wherein said system is operable in static circumstances, that is, wherein the polished rod is not reciprocated.

12. A system for collecting data indicative of a well pumping conditions according to claim 1 wherein said recorder employs a data card.

13. A system for collecting data indicative of a well pumping conditions according to claim 1 including:
a radio transmitter supported by said housing for transmitting data derived from said first and second signals to a remote location wherein the data may be employed to indicate the well pumping conditions.

14. For use with a well pumping unit having a polished rod with a string of sucker rods extending downwardly therefrom to a downhole pump that is reciprocated by the vertical reciprocal action of the polished rod to lift pumped fluid to the earth's surface, a self contained integrated system for collecting data indicative of the well pumping conditions, comprising:
a load sensing member mounted on and reciprocated with the polished rod for detecting the instantaneous weight supported by the polished rod;
a first circuit supported by and reciprocated with the polished rod and connected to said load sensing member for providing a first signal indicative of the instantaneous weight supported by the polished rod;
a plurality of accelerometers supported by and reciprocated with the polished rod providing signals in at least two axes;
a second circuit means supported by and reciprocated with the polished rod and connected to said accelerometers providing a second signal indicative of the instantaneous displacement of the polished rod;
data writer means supported by and reciprocated with the polished rod and being connected to receive said first and second signals;
a recording means connected with said data writer means to thereby receive thereon said first and second signals whereby the recording means may be employed to determine the well pumping conditions; and
a battery providing power for said load sensing means, said accelerometers, said first and second circuits and said data writer means.

15. A system for collecting data indicative of a well pumping conditions according to claim 14 including:
a housing mounted on and reciprocated with the polished rod and containing said sensing means, said accelerometers, said first circuit, said second circuit and said data writer means, the housing having means to removably receive a recording means and wherein said recording means is removably insertable in said housing irrespective of whether said polished rod is stationary or is being reciprocated as the well is pumped.

16. A system for collecting data indicative of a well pumping conditions according to claim 15 wherein said housing is in the form of a first housing portion and a second housing portion, said first housing portion being mounted on and reciprocated with the polished rod and containing said load sensing member and said first circuit, said second housing portion being readily removably attachable to said first housing portion to be thereby reciprocated with the polished rod, said second housing portion containing said accelerometers, said second circuit, said data writer means and said battery and having said means to removably receive said recording means and means of removably electrically interconnecting said first circuit to said second housing portion.

17. A system for collecting data indicative of a well pumping conditions according to claim 16 wherein one of said first housing portions and said second housing portions has structural docking pins extending therefrom and wherein the other of said first housing portion and said second housing portion has structural pin guides therein configured to telescopically receive and secure said docking pins providing means whereby said second housing is structurally attachable to and detachable from said first housing irrespective of whether said first housing portion is stationary or is being reciprocated with the polished rod.

18. A system for collecting data indicative of a well pumping conditions according to claim 15 including:
means secured to said housing for providing an operator's signal.

19. A system for collecting data indicative of a well pumping conditions according to claim 18 wherein said operator's signal is an audible signal.

20. A system for collecting data indicative of a well pumping conditions according to claim 14 wherein said load sensing member is in the form of a spool member mounted on and supporting the weight of the sucker rod string, the downhole pump and the pumped fluid and including:
strain gauge means affixed to said spool member.

21. A system for collecting data indicative of a well pumping conditions according to claim 20 wherein said strain gauge means is in the form of a plurality of rosette strain gauges each having a multiplicity of sensitive strain gauge portions, the rosettes being spaced equally apart in a common plane on said spool member and electrically connected by said first circuit whereby the outputs are integrated to provide said first signal in the form of a unified output load measurement signal.

22. A system for collecting data indicative of a well pumping conditions according to claim 21 including four rosette strain gauges each having a multiplicity of sensitive strain gauge portions connected in series and wherein said first circuit includes said rosettes being connected in a bridge with a D.C. voltage thereacross, the output of the bridge circuit providing said first signal that is responsive to the combined vertical and horizontal stress on said spool and thereby the load applied to said polished rod.

23. A system for collecting data indicative of a well pumping conditions according to claim 20 wherein said first circuit includes amplification means secured directly to said spool member adjacent to said strain gauge means.

24. A system for collecting data indicative of a well pumping conditions according to claim 14 wherein said system is operable in static circumstances, that is, wherein the polished rod is not reciprocated.

25. A system for collecting data indicative of a well pumping conditions according to claim 14 wherein said recording means is a data card.

26. A system for collecting data indicative of a well pumping conditions according to claim 14 including:
a radio transmitter means supported by said housing providing means of transmitting data derived from said first and second signals to a remote location wherein the data may be employed to indicate the well pumping conditions.

* * * * *